April 5, 1960  J. H. DE LACY  2,931,265

DRIVE SOCKET INSERT FOR HEADS OF SCREWS AND BOLTS

Filed July 22, 1957

INVENTOR.
JOSEPH DE LACY
BY Robert C. Comstock

ATTORNEY

United States Patent Office 2,931,265
Patented Apr. 5, 1960

2,931,265

DRIVE SOCKET INSERT FOR HEADS OF SCREWS AND BOLTS

Joseph H. De Lacy, Los Angeles, Calif.

Application July 22, 1957, Serial No. 673,439

5 Claims. (Cl. 85—45)

This invention relates to a recessed head insert for screws and bolts.

It is an object of my invention to provide an insert which is adapted for use with fastening devices which are not standard, in the sense that they are not made in quantity by suppliers. There are numerous occasions in manufacturing where special shapes, sizes and types of fastening device are required. These are made to order and are commonly known as "special" screws and bolts. At the present time, such special screws are generally provided with a slotted head which is adapted to receive the blade of a screwdriver. The slotting operation is generally performed by cutting with a hand hack saw if there is a small quantity or by cutting the slot in a milling machine if the quantity is sufficient to justify setting up the machine or if the appearance is important.

It is generally recognized that a recessed head is preferable to a slotted head because it is not easily deformed in use, a much greater torque can be applied to it, the turning member or key cannot slip out of the end of the slot and the key is less likely to cam up out of its recess like a screwdriver blade will do when a considerable amount of torque is applied.

It would be prohibitively expensive to broach a hexagonal or other comparable recess in a special screw. It is accordingly an object of my invention to provide a recessed head insert for screws and bolts which will provide a hexagonal or other recessed head for the screw or bolt at less actual cost than the present method of slotting the head by milling or hand sawing.

It is a further object of my invention to provide such an insert which is adapted for and capable of being used in a small or large machine shop, without requiring the use of special tools or special skills.

In essence, my invention contemplates drilling a single round opening in the head of the fastening member, such opening being adapted to receive and hold the insert. The insert itself is provided with a round smooth surfaced pilot portion which is adapted to fit within the opening. The insert is also provided with an adjacent gripping portion which is knurled or serrated, the outer dimension of the knurls or serrations slightly exceeding the dimensions of the opening. The pilot portion of the insert is placed in the opening to serve as a guide for the gripping portion when the gripping portion is pressed into the opening by means of a vise or arbor press. The pressing operation is continued until the entire insert is disposed within the opening, the outer end of the insert being substantially flush with the top of the head of the screw or bolt. The outer end of the insert is provided with a recess of the desired size and shape, so that when the recess is mounted, the head of the screw or bolt is provided with the desired recess.

It is accordingly among the objects of my invention to provide a recessed head insert for screws and bolts having all the advantages and benefits of the construction set forth above. My invention also comprises such other objects, advantages and capabilities as will later more fully appear and which are inherently possessed by my invention.

While I have shown in the accompanying drawings preferred embodiments of my invention, is should be understood that the same are susceptible of modification and change without departing from the spirit of my invention.

Referring to the drawings, Fig. 1 is a perspective view of a preferred embodiment of my insert;

Figure 1:
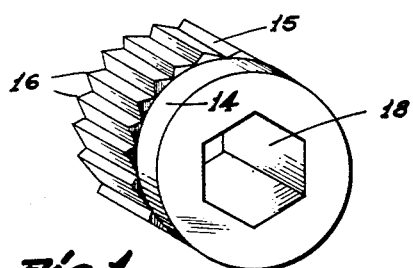
Figures 2, 3:
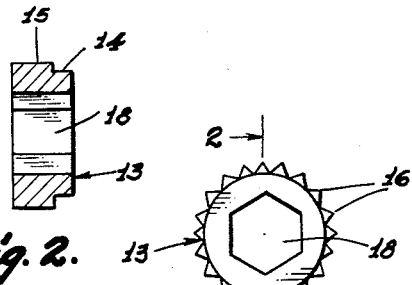
Fig. 2 is a sectional view of the same, taken along its longitudinal axis.
Fig. 3 is an end view of the same.
Figure 4:
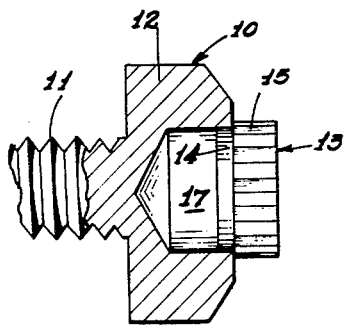
Fig. 4 is a side elevational view of my insert, with the pilot portion inserted into the opening in the head of a fastener, the fastener head being shown in section.
Figure 5:
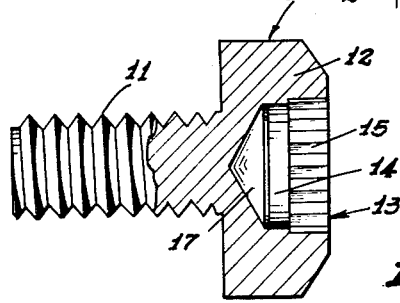
Fig. 5 is a corresponding view showing the insert in place within the head of the fastener.
Figure 7:
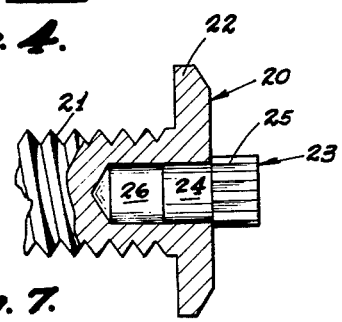
Fig. 7 is a view corresponding to Fig. 4, showing an alternative embodiment of my insert.
Figures 6, 9:
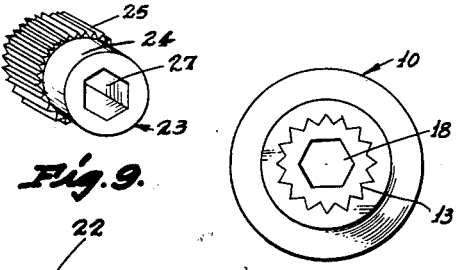
Fig. 6 is a top plan view showing the insert in place within the head of the fastener.
Fig. 9 is a perspective view of the alternative embodiment of my insert.
Figure 8:
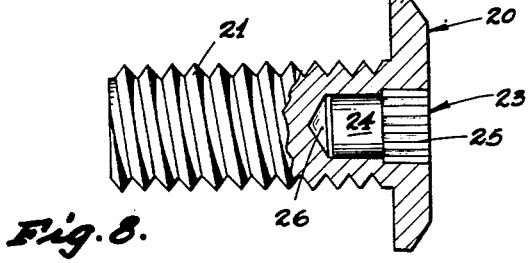
Fig. 8 is a view corresponding to Fig. 5, showing the alternative embodiment of my insert in place within the head and upper shank portion of a fastener.

A preferred embodiment which has been selected to illustrate my invention is adapted to be used in combination with a fastening device such as a screw 10 having a round screw-threaded shank 11 and a larger round head 12. My insert 13 is provided with a pilot portion 14 having a round smooth surface and an adjacent gripping portion 15. The gripping portion 15 is provided with a plurality of knurls or serrations 16, which extend around its entire periphery. In the embodiment shown, the serrations 16 are formed in the manner of triangular teeth, although other suitable types of knurling or serrations may be used with equal effectiveness. The outer diameter of the serrations 16 slightly exceeds that of the pilot portion 14. The pilot portion 14 and gripping portion 15 may be integral parts of a single member or may be separate members which are joined together to form my insert 13.

In order to adapt the screw 10 for the use of my insert 13, a round opening 17 is drilled in the head 12 from the top downwardly along the longitudinal axis of the screw 10. The opening 17 should be of sufficient size to receive the pilot portion 14 with a minimum of play. In order to determine the proper dimension for the opening 17, the user need only measure or note the dimension of the pilot portion 14 which is to be used. It is contemplated that the size of the pilot portions 14 of my inserts 13 should preferably correspond to the size of drills which are in conventional use.

After the opening 17 has been drilled, the pilot portion 14 of the insert 13 is placed within the opening 17. Pressure is then applied to the end of the gripping portion 15 and/or the screw 10 through the use of a vise, arbor press or other suitable means to press the gripping portion 15 into the opening 17. The length of the opening 17 should preferably slightly exceed the length of the insert 13, so that the pressure can be continued until the outer end of the gripping portion 15 is substantially flush with the top of the head 12.

The insert 13 is provided with a recess 18, which, in the embodiment shown in the drawings, is hexagonal in shape and extends for the entire length of the insert 13. It is anticipated, however, that any desired conventional shape may be used, such as square, triangular, pentagonal, cross-slot, clutch head, spline head, etc. The insert 13 may also be provided with a recess 18 having any desired unique shape. While it is customarily easier to form my insert so that the recess 17 extends for its entire length, this is not essential to the operation of my device. It is sufficient for the recess to extend inwardly from the top of the head far enough to receive and permit effective use of the cooperating driving member.

In the above described embodiment of my invention, the opening 17 and insert 13 do not extend into the shank of the fastening member. If the fastening member has a head which is too small to accommodate the insert, I provide an alternative construction in which the opening and insert extend into the shank.

The alternative embodiment of my invention is adapted to be used in combination with a screw or bolt 20, having a round screwthreaded shank 21 and a larger round, but comparatively thin head 22. My insert 23 is provided with a pilot portion 24 and gripping portion 25 which are formed in the manner described, except that they are preferably longer than the pilot portion 14 and gripping portion 15 of my insert 13.

In this embodiment of my invention, an opening 26 which slightly exceeds the length of the insert 23 is drilled so that it extends through the head 22 and into the shank 21. The diameter of the opening 26 must, of course, be less than that of the shank 21. The insert 23 is then mounted in the opening 26 in the manner described above. The effect is substantially the same, except that the recess 27 which is provided in the insert 23 must necessarily be smaller in diameter than the recess 18 of my insert 13.

It will be understood that this embodiment of my invention is adapted to be used with so-called "headless" screws, in which one end of the screw serves as the head portion and receives the insert.

It will be noted that in both embodiments of my invention, the pilot portion fits within the opening in the fastening member to act as a guide and prevent tipping and canting of the insert with respect to the fastening member when pressure is applied. The knurls or serrations cut their way into the sides of the opening to prevent the insert from rotating within the opening or coming out the end of the opening. The hold established between the gripping portion of the insert and the screw is sufficient to avoid any displacement of the insert during driving of the screw in either direction.

In use, my insert provides all of the advantages and benefits of a conventional one piece screw having a recessed head. This result is obtained, however, at far less cost than forming such a recess in the head of a special screw and even at less cost than a mere slotting operation.

I claim:

1. A rotatable fastening member comprising a screw threaded shank and a head integral with said shank, said head having a substantially cylindrical smooth surfaced opening extending downwardly from the top thereof substantially along the longitudinal axis of said fastening member, an insert permanently mounted in said opening to provide a hexagonal recess within said head for removably receiving a driving member to rotatably drive said fastening member, said insert having a substantially cylindrical integrally formed outwardly directed gripping portion, said gripping portion comprising a series of continuous closely spaced longitudinally directed serrations extending around the entire periphery of said insert, the outer diameter of the outer portions of said serrations being slightly greater than the inner diameter of said opening so that said serrations engage the inner wall of said opening to permanently mount and hold said insert against removal or rotation with respect to said fastening member, said insert having a hexagonal recess extending completely therethrough substantially along the longitudinal axis of said insert, the top of said insert being substantially flush with the top of said head, said insert being confined entirely within said fastening member, said insert having a substantially cylindrical smooth surfaced pilot portion disposed directly beneath said gripping portion, said pilot portion having an outer diameter slightly smaller than the inner diameter of said opening, said pilot portion being dimensioned to fit within said opening to hold said insert in substantially non-tiltable position with respect to said fastening member, whereby said insert may be pressed along the longitudinal axis of said fastening member into position within said opening.

2. A rotatable fastening member having a head, said head having a substantially cylindrical smooth surfaced opening extending downwardly from the top thereof, an insert permanently mounted in said opening to provide a non-round recess within said head for removably receiving a driving member to rotatably drive said fastening member, said insert having a substantially cylindrical gripping portion, said gripping portion having outwardly directed gripping means around its periphery, the outer diameter of the outer portions of said gripping means being slightly greater than the inner diameter of said opening so that said gripping means engage the inner wall of said opening to permanently mount and hold said insert against removal or rotation with respect to said fastening member, said insert having a non-round recess extending downwardly from the top thereof for removably receiving the tip of a driving member to drive said fastening member.

3. The structure described in claim 2, said insert having a substantially cylindrical smooth surfaced pilot portion disposed directly beneath said gripping portion, said pilot portion having an outer diameter slightly smaller than the inner diameter of said opening, said pilot portion being dimensioned to fit within said opening to hold said insert in substantially non-tiltable position with respect to said fastening member, whereby said insert may be pressed into position within said opening.

4. A rotatable fastening member, said fastening member having an opening extending downwardly from the top thereof, an insert permanently mounted in said opening to provide a non-round recess within the top of said fastening member for removably receiving a driving member to rotatably drive said fastening member, said insert having a gripping portion, said gripping portion having gripping means, the outer dimension of the outer portions of said gripping means being slightly greater than the inner dimension of the adjacent portions of said opening so that said gripping means engage the inner walls of said opening to permanently mount and hold said insert against removal or rotation with respect to said fastening member, said insert having a non-round recess extending downwardly from the top thereof for removably receiving the tip of a driving member to drive said fastening member.

5. The structure described in claim 4, said insert having a pilot portion disposed directly beneath said gripping portion, said pilot portion having an outer dimension slightly smaller than the inner dimension of the adjacent portion of said opening, said pilot portion being dimensioned to fit within said opening to hold said insert in substantially non-tiltable position with respect to said fastening member, whereby said insert may be pressed into position within said opening.

References Cited in the file of this patent

UNITED STATES PATENTS

| | | |
|---|---|---|
| 483,035 | Anthony | Sept. 20, 1892 |
| 1,432,243 | Harris | Oct. 17, 1922 |
| 2,782,827 | Rosan | Feb. 26, 1957 |

FOREIGN PATENTS

| | | |
|---|---|---|
| 940,078 | Germany | Mar. 8, 1956 |